US00RE41852E

(19) United States
(12) Reissued Patent
To

(10) Patent Number: US RE41,852 E
(45) Date of Reissued Patent: Oct. 26, 2010

(54) RECTILINEAR BINDER RING

(75) Inventor: Chun Yuen To, Hong Kong (CN)

(73) Assignee: World Wide Stationery Mfg. Co., Ltd., Kwai Chung, New Territory (HK)

(21) Appl. No.: 29/354,464

(22) Filed: Jan. 25, 2010

Related U.S. Patent Documents

Reissue of:
(64) Patent No.: Des. 585,935
Issued: Feb. 3, 2009
Appl. No.: 29/275,751
Filed: Jan. 5, 2007

(30) Foreign Application Priority Data

Jul. 6, 2006 (CN) ..... 2006 3 0131069
Jul. 6, 2006 (CN) ..... 2006 3 0131068

(51) LOC (9) Cl. ..... *19 04*
(52) U.S. Cl. ..... D19/32
(58) Field of Classification Search ..... D19/32, D19/26–30, 49, 100; 402/26, 31, 36, 38, 402/39, 41; 281/45–51, 3.1, 15.1, 21.1, 22
See application file for complete search history.

(56) References Cited

U.S. PATENT DOCUMENTS

| | | | |
|---|---|---|---|
| 1,473,354 | A | 11/1923 | Nachtrieb |
| RE18,806 | E | 4/1933 | Dawson |
| 2,103,307 | A | 12/1937 | Unger |
| 2,218,105 | A | 10/1940 | Griffin |
| 2,371,474 | A | 3/1945 | Seelman |
| 2,673,564 | A | 3/1954 | Derringer |
| 3,263,687 | A | 8/1966 | Weichert |
| 3,404,685 | A | 10/1968 | Vernon |
| 3,827,111 | A | 8/1974 | O'Connell |
| 4,552,478 | A | 11/1985 | Cohen |
| 4,792,253 | A | 12/1988 | Jacobson |
| 5,106,222 | A | 4/1992 | D'Amore |
| D325,928 | S | 5/1992 | Bourgeois |
| 5,332,327 | A | 7/1994 | Gillum |
| D356,112 | S | 3/1995 | Constantine |

(Continued)

OTHER PUBLICATIONS

World Wide Stationery Manufacturing Company Limited, publication date unknown ( A).

(Continued)

*Primary Examiner*—Philip S Hyder
*Assistant Examiner*—Kelley A Donnelly
(74) *Attorney, Agent, or Firm*—Senniger Powers LLP

(57) CLAIM

The ornamental design for rectilinear binder ring, as shown and described.

DESCRIPTION

Figure 1:
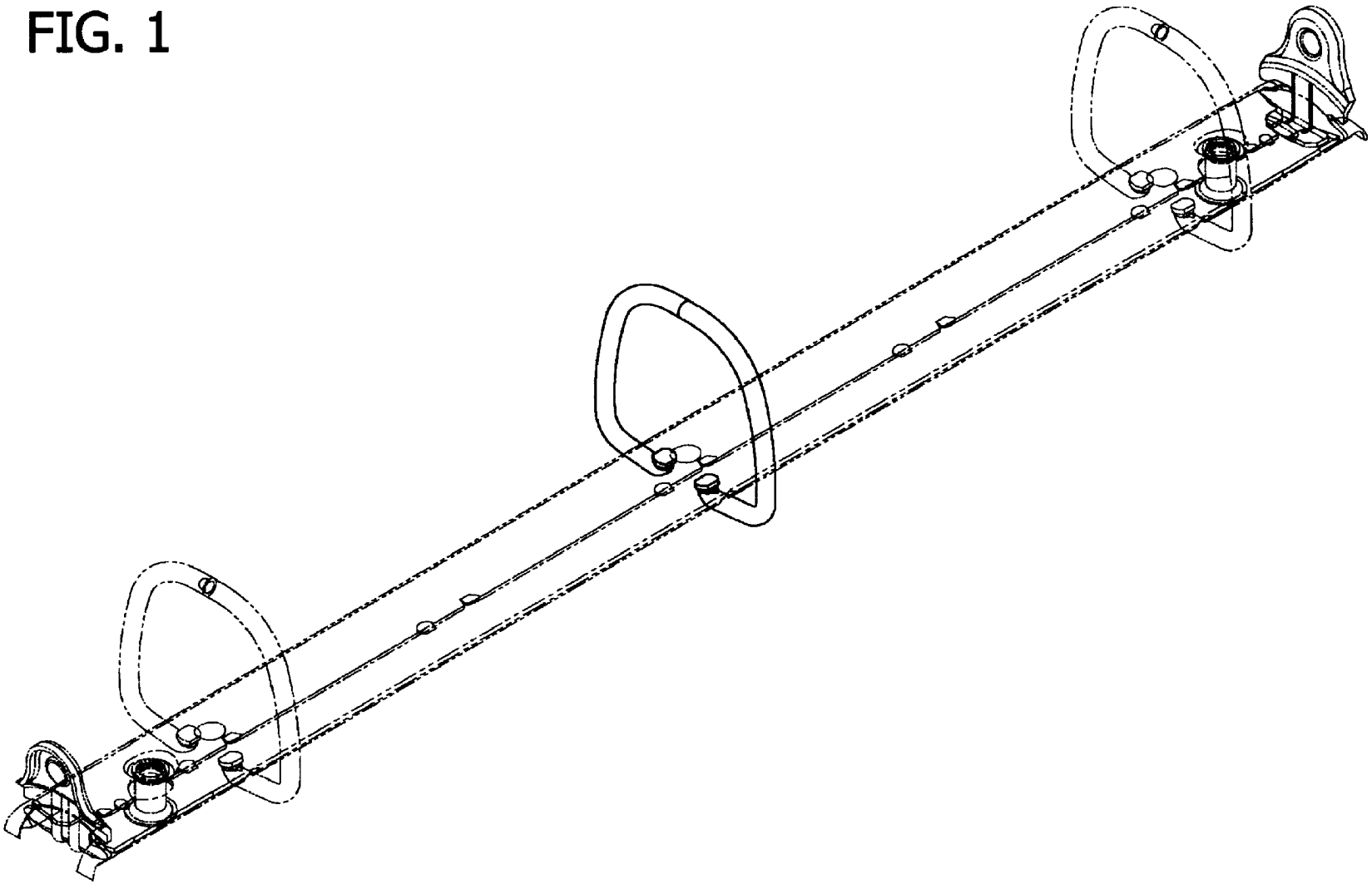
FIG. 1 is a perspective of a rectilinear binder ring attached to a ring binder mechanism, the ring binder mechanism and two other rings being shown in phantom.
Figure 2:
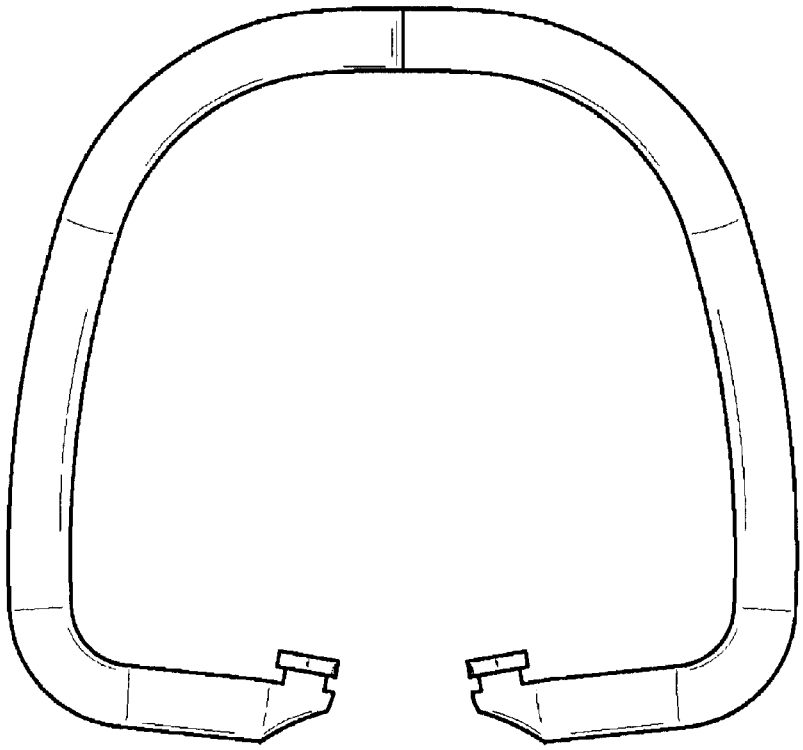
FIG. 2 is a front elevational view of the rectilinear binder ring of FIG. 1, the back elevational view of the ring being identical.
Figure 3:
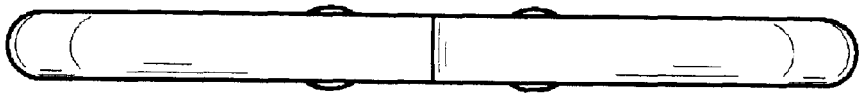
FIG. 3 is a top plan view thereof.
Figure 4:
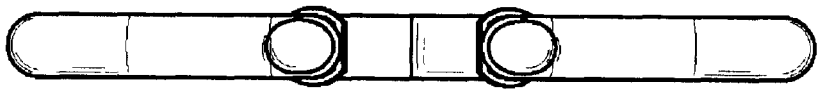
FIG. 4 is a bottom plan view thereof.
Figure 5:
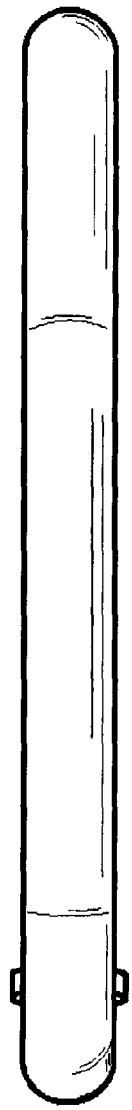
FIG. 5 is a right side elevational iew of the ring, the left side elevational view being identical.

The phantom lines in the drawings indicate environmental structure which forms no part of the claimed design.

1 Claim, 5 Drawing Sheets

Matter enclosed in heavy brackets [ ] appears in the original patent, but forms no part of this reissue; matter printed in italics indicates the additions made by reissue.

U.S. PATENT DOCUMENTS

| | | | | | |
|---|---|---|---|---|---|
| D377,805 | S | | 2/1997 | To | |
| D382,593 | S | | 8/1997 | To | |
| 5,718,529 | A | | 2/1998 | Chan | |
| D392,997 | S | | 3/1998 | Chan | |
| 5,772,348 | A | | 6/1998 | To | |
| D408,851 | S | | 4/1999 | To | |
| 5,971,649 | A | | 10/1999 | To | |
| 5,975,785 | A | | 11/1999 | Chan | |
| 5,980,146 | A | | 11/1999 | To | |
| 6,007,266 | A | | 12/1999 | Cheng et al. | |
| 6,033,144 | A | | 3/2000 | Ng et al. | |
| 6,045,286 | A | | 4/2000 | Tung | |
| D426,571 | S | | 6/2000 | To | |
| D433,445 | S | * | 11/2000 | To | D19/32 |
| 6,142,697 | A | | 11/2000 | Williams | |
| 6,217,247 | B1 | | 4/2001 | Ng | |
| 6,749,357 | B2 | | 6/2004 | Cheng | |
| 6,758,621 | B2 | | 7/2004 | To | |
| 7,241,067 | B2 | | 7/2007 | Cheng | |
| 7,275,886 | B2 | | 10/2007 | Cheng | |
| 7,296,946 | B2 | | 11/2007 | Cheng et al. | |
| 7,404,685 | B2 | | 7/2008 | Cheng | |
| D582,477 | S | | 12/2008 | To | |
| D585,935 | S | | 2/2009 | To | |
| 7,491,006 | B2 | | 2/2009 | Whaley | |
| 7,524,128 | B2 | | 4/2009 | Cheng | |
| 7,527,449 | B2 | | 5/2009 | Petrie et al. | |
| 7,530,755 | B2 | | 5/2009 | Whaley | |
| 7,549,817 | B2 | | 6/2009 | Cheng et al. | |
| D598,494 | S | * | 8/2009 | To | D19/32 |
| 7,637,682 | B2 | * | 12/2009 | To | 402/38 |
| 7,654,764 | B2 | * | 2/2010 | To | 402/31 |
| D616,023 | S | * | 5/2010 | To | D19/32 |
| 2004/0037614 | A1 | | 2/2004 | Busam et al. | |
| 2005/0013654 | A1 | | 1/2005 | Cheng et al. | |
| 2005/0201818 | A1 | | 9/2005 | Cheng | |
| 2005/0201819 | A1 | | 9/2005 | Cheng | |
| 2005/0207826 | A1 | | 9/2005 | Cheng et al. | |
| 2005/0214064 | A1 | | 9/2005 | Ng et al. | |
| 2006/0147253 | A1 | | 7/2006 | Cheng | |
| 2006/0216107 | A1 | | 9/2006 | Lin | |
| 2006/0251467 | A1 | | 11/2006 | Cheng | |
| 2007/0086836 | A1 | | 4/2007 | Cheng | |
| 2008/0075526 | A1 | | 3/2008 | Ng | |

OTHER PUBLICATIONS

World Wide Stationery Manufacturing Company Limited, publication date unknown ( B).

World Wide Stationery Manufacturing Company Limited, publication date unknown ( C).

Office action dated Jun. 11, 2008 regarding related U.S. Appl. No. 29/275,751, 8 pages.

Office action dated Aug. 4, 2009 regarding related U.S. Appl. No. 29/330,295, 6 pages.

Response filed Oct. 29, 2009 to Office Action dated Aug. 4, 2009 regarding U.S. Appl. No. 29/330,295, 6 pgs.

* cited by examiner